(12) United States Patent
Welnick et al.

(10) Patent No.: US 8,509,769 B2
(45) Date of Patent: Aug. 13, 2013

(54) METHOD AND APPARATUS FOR SCANNING FOR A WIRELESS COMMUNICATION NETWORK

(75) Inventors: William E. Welnick, Poway, CA (US);
Daniel J. Declerck, Lake Barrington, IL (US); Michelle L. Koenig, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/477,264

(22) Filed: May 22, 2012

(65) Prior Publication Data
US 2013/0005341 A1 Jan. 3, 2013

Related U.S. Application Data

(60) Provisional application No. 61/503,264, filed on Jun. 30, 2011.

(51) Int. Cl.
*H04W 4/00* (2009.01)
*H04W 36/00* (2009.01)

(52) U.S. Cl.
USPC ............................ 455/434; 455/440; 370/331

(58) Field of Classification Search
USPC ................... 455/434, 435.1, 435.2, 436, 440; 370/331
See application file for complete search history.

(56) References Cited

U.S. PATENT DOCUMENTS

| | | | |
|---|---|---|---|
| 6,829,481 B2 | 12/2004 | Souissi | |
| 7,519,364 B2 | 4/2009 | Nair et al. | |
| 7,519,365 B2 | 4/2009 | Dorsey et al. | |
| 7,536,451 B2 | 5/2009 | Ahn et al. | |
| 7,720,478 B2 | 5/2010 | Ishiguro et al. | |
| 7,737,896 B1 | 6/2010 | Suri et al. | |
| 2002/0082017 A1 | 6/2002 | Hattori | |
| 2005/0037755 A1* | 2/2005 | Hind et al. | 455/435.3 |
| 2008/0014940 A1* | 1/2008 | Parron et al. | 455/436 |
| 2009/0252131 A1* | 10/2009 | Itoh | 370/338 |
| 2009/0289601 A1 | 11/2009 | Kanade et al. | |
| 2009/0291683 A1 | 11/2009 | Kanade et al. | |
| 2009/0298437 A1 | 12/2009 | Hoefel et al. | |
| 2010/0070786 A1 | 3/2010 | Qing et al. | |
| 2010/0110930 A1* | 5/2010 | Kohvakka et al. | 370/254 |
| 2010/0167755 A1 | 7/2010 | Kim et al. | |
| 2010/0255837 A1* | 10/2010 | Kuo et al. | 455/433 |
| 2011/0045829 A1 | 2/2011 | Kubo | |
| 2012/0302241 A1* | 11/2012 | Klingenbrunn et al. | 455/436 |

OTHER PUBLICATIONS

Patent Cooperation Treaty, International Search Report and Written Opinion of the International Searching Authority for International Application No. PCT/US2012/042157, Aug. 8, 2012, 12 pages.

* cited by examiner

*Primary Examiner* — Christopher M Brandt

(57) ABSTRACT

A method and apparatus for performing the method are provided. The method includes operating a mobile device in a first network while a timer of the mobile device is running to prevent the mobile device from scanning for a second network. The method also includes determining a distance that the mobile device is from a reference location, where the reference location is associated with where the mobile device is prevented from scanning for the second network. The method further includes adjusting the timer when the determined distance from the reference signal exceeds a threshold. When the determined distance exceeds the determined distance, the mobile device can scan for the second network.

19 Claims, 4 Drawing Sheets

METHOD AND APPARATUS FOR SCANNING FOR A WIRELESS COMMUNICATION NETWORK

FIELD OF THE INVENTION

The present disclosure relates generally for scanning for a second wireless communication network when a mobile device operates in a first wireless communication network and, in particular, relates to overriding a timer that prevents the mobile device for scanning for the second communication network when the mobile device is a sufficient distance from a reference location.

BACKGROUND

Dual-mode mobile devices are capable of operating in different wireless communication networks. Such mobile devices are also able to operate in wireless communication networks of different generations, e.g. 2G systems, e.g. CDMA and GSM systems, and 3G systems such as 1xEvDO systems. Moreover, 1x and 3G systems often operate concurrently in the same area and 3G systems can be backward compatible with 2G systems. These different generations offer varied capabilities and features for the user of the mobile device. In particular, different generations of wireless communication networks have different capabilities as to methods and systems for handling voice and data. Third and forth generation systems are designed, at least in part, to improve system performance with increased data transmissions.

Many 3G mobile devices are inherently data centric and therefore transmit and receive a lot of data. Wireless network carriers want for data to be transferred over 3G systems for the advantages that the 3G systems provide by their design and for increased data performance and efficiencies over 2G systems. At the same time, 3G systems can permit a mobile device to receive voice communications simultaneously during data transfer.

It is understood, however, that data centric communications provided by 3G systems can have an adverse affect on the battery life of the mobile device. Thus, many carriers require different mechanisms to limit data communications under given circumstances to make sure that the battery life of the mobile device is optimized. One such mechanism is to limit a mobile devices ability to connect to a 3G system for a period of time after multiple failed attempts to access the 3G system. This methodology can work well for a mobile device that is stationary or that operates primarily within one cell or sector because the conditions that the mobile device is operating in do not change significantly over a period of time. On the other hand, this method does not provide the benefits to the mobile device when conditions improve and when the mobile device is highly mobile.

In view of the foregoing, there is a need to provide a method and an apparatus that improves a mobile device's access to 3G systems and capabilities.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
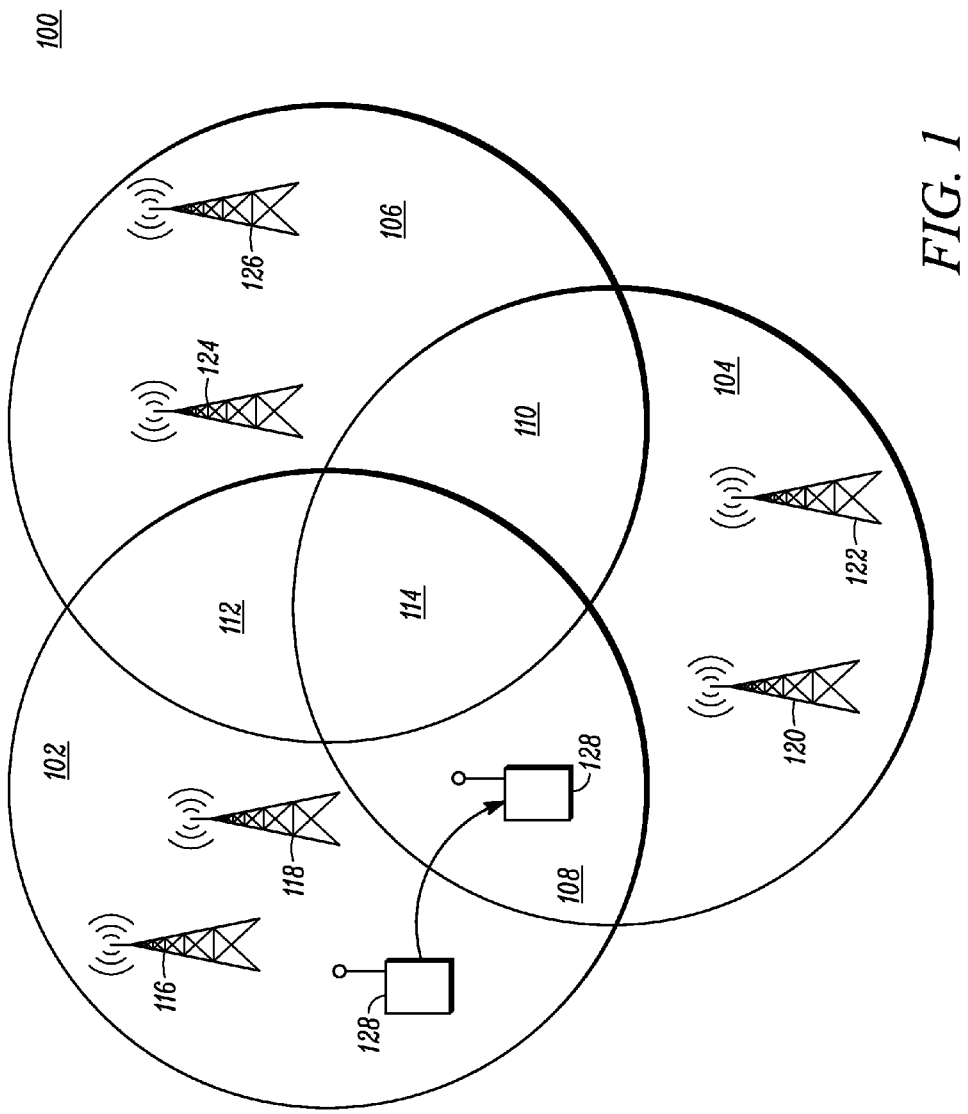
FIG. 1 is an example of different wireless communication networks in which a dual mode mobile device can operate in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and apparatus for scanning for a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of scanning for a wireless communication network described herein. The non-processor circuits may include, but are not limited to, a radio receiver, a radio transmitter, signal drivers, clock circuits, power source circuits, and user input devices. As such, these functions may be interpreted as steps of a method to perform scanning for a wireless network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present disclosure is directed to a method and apparatus that scans for wireless communication networks. Under given circumstances, such as after repeated failed attempts to scan for a 3G wireless network, a mobile device is blocked from scanning for and accessing the 3G wireless network for a period of time. The period of time can be as long as 15 minutes. This may be appropriate when the mobile device is stationary or moves relatively small distances within a cell or sector.

During the time that the mobile device is blocked from scanning, the mobile device is also blocked from taking advantages that operating in the 3G network. There are situations, however, that it is no longer appropriate for the mobile device to be blocked from scanning for and possibly using the 3G network. Thus, the present disclosure includes a method that includes operating in a first network, such as a 2G wireless communication network, while a mobile device is prevented from scanning for a second network and determining a distance that the mobile device is from a reference location within the first network. The method further permits scanning for the second network when the determined distance from the reference signal exceeds a threshold.

In an embodiment, the method determines a distance that the mobile device is from a reference location by counting the number of handovers for mobile device from the reference location. In another embodiment, the method determines the distance that the mobile device is from a reference location by setting a timer when the mobile device hands off from the base station or a sector corresponding to the reference location. In yet another embodiment, the method determines a distance that the mobile device is from a reference location by using location information obtained from global positioning systems. The method can also determine the distance that the mobile device is from a reference location by determining a current location of the mobile station and comparing the current location to previous locations that mobile devices scanned for the second network. Moreover, an embodiment can include determining the distance that the mobile device is from a reference location by determining a time interval of mobile device having lost a reference pilot signal.

In addition, the method of scanning for the second network can include adjusting a timer set after repeated failed attempts to scan for the second network wherein the timer prevents the mobile device from scanning for the second network. The method can also include putting the mobile device in a dormant state to allow the mobile device to scan for the second network. Moreover, the method can include determining that mobile station is prevented from scanning for the second network by a timer being reset as the mobile station continues on a data call.

In another embodiment of the present disclosure, the method includes operating a mobile device in a first network, such as a 2G network, while a timer of a mobile device is running that prevents the mobile device from scanning for a second network. The method includes determining a distance that the mobile device has moved from a reference location of the mobile device. The method also includes overriding or resetting the timer when the determined distance exceeds a threshold. When the timer has been overridden or reset, the mobile device can scan for the second network.

An apparatus such as a mobile device is also disclosed. The mobile device can include an antenna, a transceiver coupled to the antenna, wherein the transceiver is for transmitting and receiving control information, voice and data, and a scanner. The apparatus can also include a processor that is coupled to the transceiver and the scanner. The processor is configured to determine a distance that a mobile device is from a reference location when the mobile device is operating in a first network while the scanner is prevented from scanning for a second network and operating the scanner to scan for the second network when the determined distance from the reference signal exceeds a threshold.

Turning to FIG. 1, a wireless communication system 100 is shown. The wireless communication system 100 includes at least two different wireless communication networks, 102, 104 and 106. In an embodiment, one of the wireless communication networks 102 can be any of the various known 2G networks, such as Code Division Multiple Access (CDMA) or Global System for Mobile Communications (GSM). The other wireless communication networks 104 and 106 can be one of the known 3G technologies and that includes CDMA 2000 (cdma2000), wide-band CDMA (W-CDMA), Universal Mobile Telecommunication System (UMTS), WiFi (IEEE 802.11), WiMAX (IEEE 802.16) and other technologies. In addition, more advanced generations of technologies are being developed such as 3.5G and 4G. Collectively these 3G, 3.5G, 4G and other advanced technologies are referred to as 3G networks in this application. Each of the networks or domains 102-106 covers a given geographical area within the system 100. As seen in FIG. 1, there are areas within the system 100 where the domains overlap such that in certain geographical areas wireless communications coverage can be provided by more than one wireless communication network. For example, coverage is provided by networks 102 and 104 in area 108; coverage is provided by networks 104 and 106 in area 110, and coverage is provided by networks 102 and 106 in area 112. In addition, coverage is provided for area 114 by networks 102, 104 and 106.

The wireless communication networks 102-106 each include one or more access points, base stations or eNode Bs 116-126, collectively referred to as base stations. In a known manner, the base stations 116-126 are arranged and configured within the corresponding networks 102-104 to provide wireless communications to mobile devices 128. The mobile devices 128 can be dual mode devices so that they are able to operate in both 2G and 3G networks. In addition, each of the networks includes other various infrastructure components and equipment (not shown) so that the mobile devices 128 can communicate with the base stations 116-126 and will operate according to any of a number of different 2G or 3G technologies. It is possible that neighboring wireless communication networks can operate using the same wireless communication technology. In an embodiment of the present invention, however, the networks 102-106 use differing wireless communication technologies such that network 102 can be a 2G network while network 104 can be a given type of 3G network and network 106 can be another type of 3G network.

As can be appreciated, mobile device 128 is mobile and can move within each of the networks 102-106 as well as between networks 102-106. For example, device 128 can move from network 102 to network 104, represented by arrows 136. When a wireless communication device moves in such a manner, a domain transfer from one network 102 to another network 104 can occur. Various different types of domain transfers are known. The most common form of domain transfer is from one network to another network where the domains use the same or similar wireless communication technologies. Areas 108-114 are provided so that there are areas within the system 100 where wireless communication service can be provided by more than one technology. Thus, within an area 108-114 a mobile device can attempt to access different networks to provide service based on the strengths and weaknesses of the different technologies, the requirements of the mobile device and other criteria. As can be appreciated, the domain transfer procedures are designed and specified by the various technologies and can include the mobile device scanning for the presence of other networks while in a given network. When a wireless communication device is in an area, for example area 108, where 3G and 2G networks are operating, it may be desirable for the mobile device to access the 3G network to improve the performance of the mobile device such as increasing data transfer to the mobile device.

Figure 2:
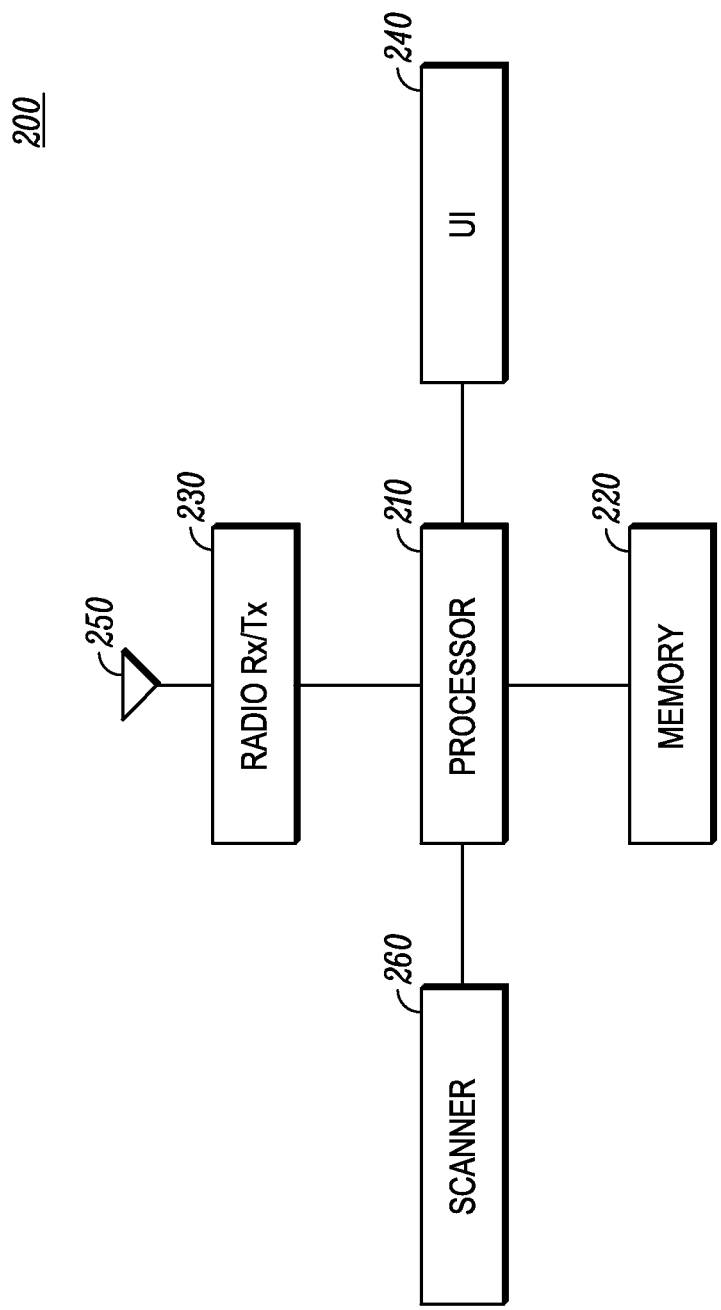
FIG. 2 is a block diagram of a mobile device such as a dual mode mobile device that operates in accordance with some embodiments of the invention.

In FIG. 2, a mobile device 200, which corresponds to the mobile device 128, is shown. Mobile device 200 can be any of various types of device such as cell phones, smartphones, personal digital assistants and laptop, lapbook and tablet computing devices. The mobile device includes a controller/processor 210 communicably coupled to memory 220, a transceiver 230, user interface (UI) 240, antenna 250 and scanner 260 which are coupled together via a system bus (not shown). Similar components are used as a part of base stations 116-126. The mobile device 200 can be a dual mode device and is therefore compliant with multiple protocols of the wireless communication system, including 2G and 3G networks. Thus, mobile device can include multiple antennas and transceivers, while only one such component is shown, to operate in the multiple networks. In FIG. 2, the controller/processor 210 may be implemented as any programmed processor and may be configured to operate with the different antennas and transceivers for the different 2G and 3G networks. However, the functionality described herein may also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a programmable logic array, field programmable gate-array, or the like.

In FIG. 2, the memory 220 may include volatile and non-volatile data storage, including one or more electrical, magnetic or optical memories such as a random access memory (RAM), cache, hard drive, read-only memory (ROM), firmware, or other memory device. The memory may have a cache to speed access to specific data. Data may be stored in the memory or in a separate database. The memory may be embedded with an ASIC that may include the baseband processor. Such memory is sometimes referred to as on-chip memory. Alternatively, the memory may be shared with other processors in the device such as an application or graphics processor, in which case the memory may be referred to as off-chip memory. The transceiver 230 and antenna 250 are capable of communicating by transmitting and receiving data with mobile devices 200 and base stations 112-126 pursuant to the 2G and 3G wireless communication protocol implemented. The scanner is a component used by the mobile device 200 to scan for presence of other networks while the mobile device 200 is operating in a given network. For example and as explained in more detail below, the scanner is used to determine if a 3G network is available while the mobile device is operating in a 2G network. The UI 240 connects to one or more input devices that may include a keyboard, mouse, pen-operated touch screen or monitor, voice-recognition device, or any other device that accepts input. The UI may also connect to one or more output devices, such as a monitor, printer, disk drive, speakers, or any other device provided to output data. As can be appreciated, the base stations 116-126 are comparably equipped with the controller/processor 210 communicably coupled to memory 220, a transceiver 230 and antenna 250, to operate in conjunction with the mobile device 128, 200 in a known manner according to the various 2G and 3G networks.

Figure 3:
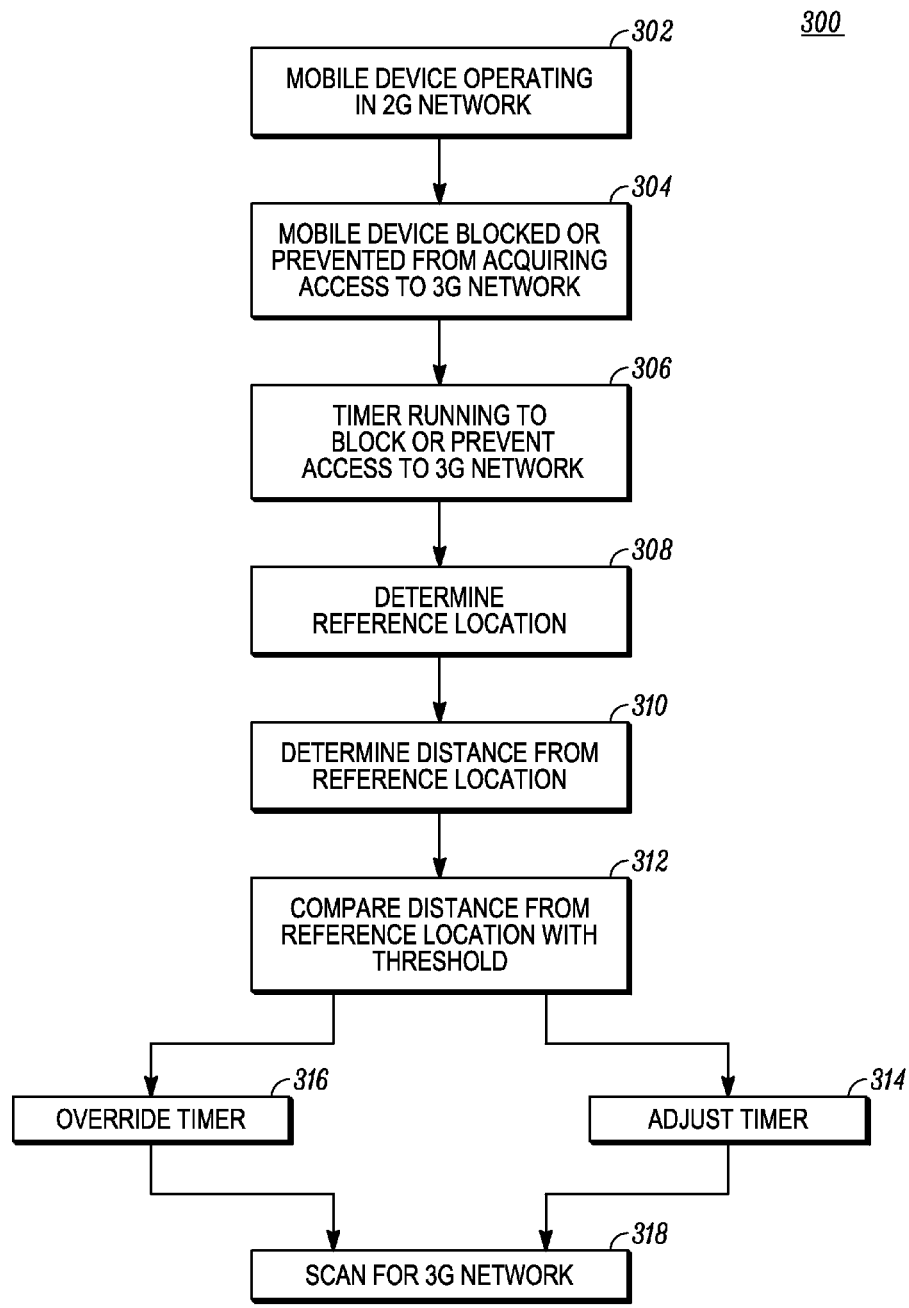
FIG. 3 is a flow diagram that describes the operation of the mobile device in accordance with some embodiments of the invention.

FIG. 3 is a flow diagram 300 that illustrates the operation of the mobile device in scanning for wireless communication networks. A mobile device 128, 200 that is operating 302 in a wireless network 102, which can be a 2G system, may search for a second network, such as a 3G network 104, 106. The mobile device 128 can be prevented or blocked 304 from acquiring access to the second network for any number of reasons including but not limited the mobile device 128 is not in the vicinity of the 3G network 104 or the mobile device 128 has had repeatedly failed to access the 3G network after multiple attempts or when a maximum number of access probes is reached. The mobile device 128 is blocked or prevented from accessing the 3G network 104, 106 by not scheduling the mobile device to scan for the 3G network and not scheduling the mobile device 128 from transmitting access probe messages to 3G base stations 120-126. The mobile device 128 may be blocked for long periods of time, which can be measured by a block timer and can extend to up to 15 minutes. As understood, the mobile device does not scan for the 3G network while the block timer is running 306 for the time to which it is set. This situation may be appropriate when the mobile device is stationary or when the RF conditions are not likely to change. In other situations, however, it is possible to override or reset the block timer so that the mobile device can scan for access to the 3G network, if it is available.

In addition, the mobile device may be blocked from acquiring the second network 104 because of its operating status. For example, a mobile device performing a data application while in a 2G network 102 may be prevented from switching into a dormant mode. In the dormant mode, the mobile device may be able to scan for a second network, such as 3G network 104, and then the data transfer can resume from the 3G network. Thus, it is possible for the mobile device 128 to scan for access to the 3G network while it is operating certain data applications in a 2G network when the mobile device would otherwise be prevented to acquiring the 3G network.

For the mobile device 128 to acquire a second network, such as 3G network 104 while being blocked or prevented from scanning for that 3G network, different conditions may be necessary. For example, the location of the mobile device 128 should be different, the RF conditions should change or the mode of the mobile device 128 should change from active to dormant such that it is understood that it is no longer necessary for the mobile device to be blocked from scanning for the 3G network.

Referring to the situation where the location of the mobile device 128 has changed, a reference location is determined 308. The reference location may be any location that the mobile device 128 is blocked from accessing the second network while operating in a first network. In an embodiment, the reference location can be the location within the 2G network 102 where the mobile device is initially blocked or prevented from accessing the 3G network. This location can be the location where the maximum number of access probes is reached or the location that the mobile device 128 is stationary within the network. The reference location can be denoted by its GPS coordinates or the pilot reference identifier used by the mobile device at the reference location.

Once the reference location is determined, a distance from the reference location is determined 310. As explained in more detail below, the distance can be measured by a number of different methods which include measuring the actual distance or using other methods or mechanisms, e.g. time or system operations, from which the distance can be determined. The distance from the reference location is compared 312 with a threshold. The threshold is a value that is set such that the conditions within the 2G network 102 have changed sufficiently to scan for the 3G network 104. The threshold can be dynamic with respect to different mobile devices 128 and different reference locations. A relatively small threshold can be used when it is known that a 3G network is close, e.g. at the edge of the 3G network 104, or a relatively large threshold can be used in locations where it known that 3G network access is not readily available, e.g. rural areas.

Once the measured distance from the reference location reaches a threshold, the mobile device 128 can adjust 314 or override 316 the block timer. When the block timer is adjusted, the block timer is reset to a lesser time. When the block timer is overridden, it is brought to zero, or the mobile device is forced to send access probe messages or scan for the 3G network regardless of time remaining on the block timer. When the block timer expires, the mobile device can scan 318 for the 3G network. The scanning is performed using standard scanning techniques used by the mobile device 128 such as by sending access probes in search of a base station within in the 3G network 104. Thus, the mobile device 128 scans for the 3G network when the determined distance from the reference point exceeds the threshold.

Figure 4:
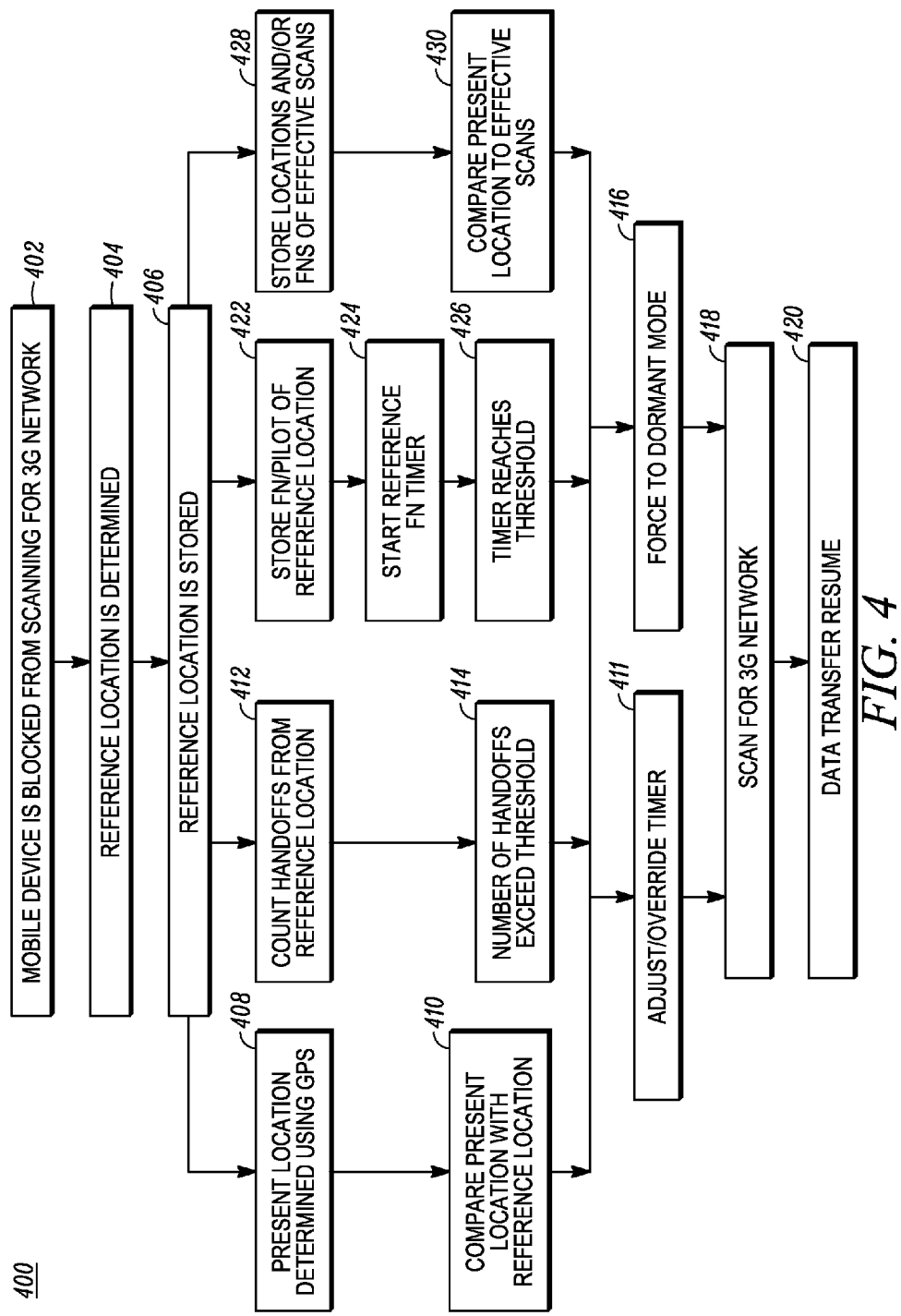
FIG. 4 is a flow diagram that describes the operation of the mobile device in accordance with some embodiments of the invention.

As expressed above, there are different methods to be able to determine the reference location, and these can be seen in FIG. 4. According to FIG. 4, the mobile device 128 is blocked or prevented 402 from scanning for a second network such as 3G network 104. A reference location is determined 404, which can correspond to the location that the mobile device 128 is initially blocked from scanning for the second network for any reason. The reference location can be determined by using the 1X pilot (PN) of the mobile device in the 2G network. The reference location can also be determined using known location techniques including using Global Positioning System (GPS) techniques. The reference location denoted by longitudinal and latitudinal or other types of coordinates is stored 406 in the memory 220.

In an embodiment, the distance from the reference location is determined by comparing a present location of the mobile device 128 with the reference location. The present location can be determined by using GPS techniques 408 of the mobile device 128. The GPS coordinates of the present location is compared 410 to the GPS coordinates of the reference location that are stored in memory. If the distance from the reference location exceeds or is greater than the threshold, the block timer can be overridden and the mobile device can scan for the second network 104.

When using GPS information, simple distance calculations can be used to determine the distance form the reference location. In an example, if the distance from the reference location is determined to be greater than 400 feet, which is approximately 0.001 degrees delta in longitude and latitude, a given value, such as ⅓, the block timer can be reduced by ⅓. If the distance is greater than 4000 feet, which is approximately 0.01 degrees delta, the block timer can be reduced by another given value, such as another ⅓. If the distance is greater than 40,000 feet, which is approximately 0.1 degrees, the block timer can be set to a given value or to a value when the block timer is set to expire.

In another embodiment, the representation of the present location can be determined by counting the number of handoffs 412 that have occurred since the reference location, which can be a reference PN, was set. As is known, a mobile device is handed off from one base station to another base station for any number of known reasons, e.g. weak signals from the serving base station, measured high interference, etc. With each successive hand off, it can be determined that the mobile device is moved further from the reference location. A threshold number of handoffs can be set to designate that the mobile device has traveled a requisite distance from the reference location. When counting the number of hand offs, reentry into previously counted cells can be taken into account so that scanning is not initiating in a cell where the conditions that caused the mobile device to be blocked from scanning do not still exist. In an embodiment, the threshold of handoffs can be a value of 2 without handing off back to the reference PN. When the number of handover exceeds the handover threshold 414, the block timer can be overridden to allow the mobile device 128 to scan for the 3G network 104. Alternatively, the block timer can be reset to a lesser value if it exceeds a given value. For example, the block timer can be reset to 30 seconds if the block timer is currently valued at over 60 seconds.

If the mobile device is data active while in a 2G network, the mobile device 128 can be forced 416 into dormant mode. In dormant mode, the mobile device 128 can scan 418 for the 3G network. When the 3G network is acquired, the data transfer can resume 420.

In another embodiment, the mobile device can check the time after which it has been handed over from the reference location, which is determined using a reference PN. This method can be useful for mobile devices 128 that are mobile within a limited number of sectors or base stations. The reference location or PN is saved 422 when the mobile device 128 when the mobile device is communicating with a base station in the 2G network. In an embodiment the reference PN is stored when at the time or sometime before the mobile device 128 is blocked or prevented from accessing the second network 104. A reference PN timer, which is different from the block timer used to determine the length of time the mobile device is blocked from scanning for the 3G network, is started 424 when the mobile device is handed off from one base station 116 in network 102 to another base station, which can be base station 118 in network 102 or base station in another network 104, 106. The handoff is determined by comparing the current PN of the sector or cell in which the mobile device 128 is operating and the reference PN. When the reference PN timer reaches a threshold period of time 426, the block timer used to block scanning can be reset. For example, the block timer can be reset to 30 seconds if the block timer is currently valued at over 60 seconds.

In another embodiment, locations where it is known that the mobile device can scan for a 3G network can be used to override the blocking timer. Locations that handoffs from a 2G network to a 3G network can be stored 426 in the memory 220 of the mobile device 128. The present location of the mobile device can be compared 428 with the stored known locations of successful scanning. When the present location matches the known location, the timer can be overridden or adjusted and the mobile device can scan for the 3G network.

In view of the foregoing, it is understood that a mobile device 128 does not have to wait until a block timer expires for it to start scanning for a new network, such as a 3G network, when the mobile device has been blocked from scanning for that network. The timer can be adjusted or overridden under given circumstances when the mobile device's conditions are sufficiently different from those conditions when the mobile device was blocked or prevented from scanning. Thus, the purpose of the timer, which restricts the mobile device from scanning for a 3G network because of current conditions, e.g. repeated failed access probe attempts, can be maintained while allowing the access to the 3G network under other conditions. The mobile device is therefore not always scanning for the 3G network but is permitted to scan under changed conditions. The 2G and 3G network will not be overwhelmed by access probes and scanning by the mobile device. As is understood, movement by the mobile device away from a reference location where the mobile device is blocked from scanning to another location sufficiently distant from that reference location provides an opportunity for the mobile device to adjust and override the timer. Movement can be detected using location techniques, counting handoffs, determining the time that the mobile device is away from a reference location or reference pilot, comparing current locations to known locations.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method comprising:
    operating in a first network while a mobile device is prevented from scanning for a second network;
    determining a distance that the mobile device is from a reference location, and
    scanning for the second network and overriding a running timer when the determined distance from the reference location exceeds a threshold, wherein the running timer prevents the mobile device from scanning the second network.

2. The method of claim 1 wherein the determining a distance that the mobile device is from a reference location comprising counting the number of handovers for the mobile device from the reference location.

3. The method of claim 1 wherein the determining a distance that the mobile device is from a reference location comprising setting a timer when the mobile device hands over from a sector corresponding to the reference location.

4. The method of claim 1 wherein determining a distance that the mobile device is from a reference location comprising using location information obtained from global positioning systems.

5. The method of claim 1 wherein determining a distance that the mobile device is from a reference location comprising:
    determining a current location of the mobile station, and
    comparing the current location to previous locations that mobile devices scanned for the second network.

6. The method of claim 1 wherein determining a distance that the mobile device is from a reference location wherein the reference location is associated with a reference pilot signal and comprising determining a time interval from when the mobile device changes a pilot signal from the reference pilot signal.

7. The method of claim 1 further comprising putting the mobile device in a dormant state to allow the mobile device to scan for the second network.

8. The method of claim 1 further comprising determining that the mobile station is prevented from scanning for the second network by the timer being reset as the mobile station continues on a data call.

9. A method comprising:
    operating in a first network while a timer of a mobile device is running to prevent the mobile device from scanning for a second network;
    determining a distance that the mobile device is from a reference location;
    adjusting the timer when the determined distance from the reference location exceeds a threshold, and
    scanning for the second network.

10. The method of claim 9 wherein the determining a distance that the mobile device is from a reference location comprising counting the number of handovers for the mobile device from the reference location.

11. The method of claim 9 wherein the determining a distance that the mobile device is from a reference location comprising setting a timer when the mobile device hands over from a sector corresponding to the reference location.

12. The method of claim 9 wherein determining a distance that the mobile device is from a reference location comprising:
    determining a current location of the mobile station, and
    comparing the current location to previous locations that mobile devices scanned for the second network.

13. The method of claim 9 wherein adjusting a timer set comprising one of reducing the timer and overriding the timer.

14. The method of claim 9 further comprising determining that the mobile station is prevented from scanning for the second network by a timer being reset as the mobile station continues on a data call.

15. An apparatus comprising:
    an antenna;
    a transceiver coupled to the antenna for transmitting and receiving control information, voice and data;
    a scanner, and
    a processor coupled to the transceiver and the scanner wherein the processor for determining a distance that a mobile device is from a reference location when the mobile device is operating in a first network while the scanner is prevented from scanning for a second network and operating the scanner to scan for the second network when the determined distance from the reference location exceeds a threshold.

16. The apparatus of claim 15 wherein the processor further counting the number of handovers for the mobile device from the reference location.

17. The apparatus of claim 15 wherein the processor further setting a timer when the mobile device hands over from a sector corresponding to the reference location.

18. The apparatus of claim 15 wherein the processor further determining a current location of the mobile device and comparing the current location to previous locations that mobile devices scanned for the second network.

19. The apparatus of claim 15 wherein the processor further determining a time interval of the mobile device having lost a reference pilot signal.

* * * * *